United States Patent
Koppelberg et al.

[11] Patent Number: 5,931,487
[45] Date of Patent: Aug. 3, 1999

[54] BRAKE DIVE COMPENSATOR

[76] Inventors: Günter Koppelberg, Ilphulweg 27, D-31785 Hameln; Norbert Düwel, Bromberg 4, D-32683 Barntrup, both of Germany

[21] Appl. No.: 08/605,200
[22] PCT Filed: Mar. 1, 1995
[86] PCT No.: PCT/DE95/00291
§ 371 Date: Feb. 27, 1997
§ 102(e) Date: Feb. 27, 1997
[87] PCT Pub. No.: WO95/23728
PCT Pub. Date: Sep. 8, 1995

[30] Foreign Application Priority Data

Mar. 4, 1994 [DE] Germany .......................... 94 03 640 U

[51] Int. Cl.$^6$ .................................................. B62K 25/08
[52] U.S. Cl. ................. 280/276; 280/279; 280/124.104; 280/124.105
[58] Field of Search ..................... 280/276, 277, 280/279, 283, 124.104, 124.105; 188/26

[56] References Cited

U.S. PATENT DOCUMENTS

| | | |
|---|---|---|
| 3,694,004 | 9/1972 | Siebers . |
| 3,989,261 | 11/1976 | Kawaguchi ............................. 280/276 |
| 4,180,280 | 12/1979 | Doveri . |
| 4,437,678 | 3/1984 | Schultz ..................................... 280/276 |
| 4,480,711 | 11/1984 | Satoh et al. .............................. 280/276 |
| 4,520,892 | 6/1985 | Satoh ....................................... 280/276 |
| 4,776,609 | 10/1988 | Pan et al. ................................. 280/276 |

FOREIGN PATENT DOCUMENTS

| | | |
|---|---|---|
| 1067221 | 6/1954 | France . |
| 77 36552 | 9/1978 | France . |
| 3833880 | 4/1990 | Germany . |
| 488283 | 12/1953 | Italy ....................................... 280/276 |
| 3189433 | 8/1981 | Japan . |
| 5069875 | 3/1993 | Japan ..................................... 280/276 |
| 1 540 824 | 2/1979 | United Kingdom . |
| 1545403 | 5/1979 | United Kingdom ................... 280/276 |
| 84/00526 | 2/1984 | WIPO ..................................... 280/276 |

*Primary Examiner*—Daniel G. DePumpo
*Attorney, Agent, or Firm*—Burns, Doane, Swecker & Mathis, L.L.P.

[57] ABSTRACT

The description relates to a braking dive compensator for single-track vehicles. The front wheel (7) with its axle (13) and a brake anchor plate (1) are arranged on a trailing link (4). The link (4) is supported via a sprung component (8) on one fork (3) and, on braking, a force counteracting the braking dive force is taken from the brake anchor plate (1) and the fork (3). Between the brake anchor plate (1) and the fork (3) is articulated a pushrod (2) which assumes an acute angle ($\alpha$) with the longitudinal axis of the link (4) under tension.

20 Claims, 1 Drawing Sheet

BRAKE DIVE COMPENSATOR

BACKGROUND AND SUMMARY

The invention relates to a brake dive compensation device for the front wheel suspension of a single-track (two-wheeled) vehicle.

Front wheel suspension systems for single-track vehicles are usually designed with telescopic forms, pushed swinging arms, or pulled swinging arms. By contrast with designs with pushed swinging arms and telescopic forks, a drawn swinging arm has the advantage that the suspension responds better to uneven ground, since the direction of the force components which arise when driving over uneven ground, in the case of drawn swinging arms, lie approximately in the direction of movement of drawn swinging arms, while with pushed swinging arms or telescopic forks the force components occur obliquely to the direction of movement of the pushed swinging arms or telescopic forks respectively.

The disadvantage of the design with drawn swinging arms, however, resides in the fact that the spring suspension dives especially deep when the front axle is braked. In the case of telescopic forks and pushed swinging arms, this effect is less strongly marked, especially since pushed swinging arms counteract the dive effect.

DE 38 33 880 A1 already relates to systems for preventing diving. FIGS. 1, 2, 4 and 5 show arrangements with drawn swinging arms, of which FIGS. 1, 2 and 4 show arrangements with a rim brake, and FIG. 5 an arrangement with a drum brake. The explanations for FIG. 5 do not, however, allow for the functional method of this design to be appreciated.

The invention is based on the task of improving a brake dive compensation arrangement for a front wheel suspension system of a single-track vehicle in such a way that reliable compensation is achieved for the diving forces which occur during braking, without the spring travel and the spring characteristics being restricted in the process.

This task is resolved in the form of a brake dive compensation device according to the present invention.

In the design according to the invention, the brake carrier is not supported on the swinging arms but on the wheel guide carrier, with the result that the force which is exerted by the wheel guide carrier due to the braking procedure is conducted into the wheel guide carrier, and the linkage combination of swinging arm, wheel guide carrier, brake carrier, and thrust rod always creates a resultant force in the wheel guide carrier which precisely counteracts the dive force because of the wheel load which occurs during braking.

As a result of this, spring suspension comfort is fully retained even during braking, and, in addition to this, so too is the run-on of the front wheel, which guarantees constant steering stability.

For preference, the thrust rod, with the vehicle under static operational loading conditions, points at approximately right angles to a radial central axis of the brake carrier.

The term "static operational loading conditions" is understood to mean the state under which the dead weight of the vehicle and the weight of a driver, for whom the suspension has been designed, take effect on the suspension of the front wheel, either at a standstill or at a constant speed. The drawn swinging arms with the spring element then adopt a position in which the spring reserves are approximately equal in both directions. This position is also designated as the zero position.

When the thrust rod, with the vehicle under static operational load conditions, is pointing approximately tangential, the device fluctuates about the tangential position as the load is imposed on the suspension and then relieved, with the result that, to a large extent, linearity can be guaranteed for the force which is to be applied to compensate for brake dive.

According to another embodiment, provision can be made for several jointed connection points on the wheel guide carrier for optional securing of the thrust rod. In this way, the angle alignment can be slightly changed, with the result that adaptation is possible, for example, to drivers of differing sizes and weights. Depending on size, seat height, and weight of the driver, a different static centre of gravity will be derived, which then in turn also influences the dynamic wheel load distribution during braking.

For preference, the wheel guide carrier is subdivided into an upper section and a lower section, which is angled off from the upper section in the direction of travel, and the spring element is arranged axially within the upper section. This arrangement allows for an especially compact design, since on the one hand the hollow space of the wheel guide carrier is used to accommodate the spring element, and, on the other, the force induced via the spring element into the wheel guide carrier is imposed axially, with the result that no transverse forces are incurred.

The lower end of the spring element can be connected by a jointed link to the swinging arm in the direction of travel in front of or behind the wheel axle or at the brake carrier. The result of this is that the bearing between the spring element and the swinging arm or the brake carrier respectively can be spatially separated from the bearing, between the brake carrier and the swinging arm, with the result that the bearings can lie in one plane, so making the design more streamlined. If the lower end of the spring element is connected by a jointed link to the swinging arm in the direction of travel, in front of the wheel axle, then a reduction occurs of the wheel stroke to the spring stroke, with the result that the spring travel, and therefore also the installation length of the spring element, can be reduced.

The spring element may include an adjustment device for the adjustment of a constant zero position under the effect of differing static operational loads. This allows for the zero position of the spring element and the swinging arm to be adjusted also for extremely light or extremely heavy drivers, whose weight differs substantially from a normal weight of about 75 kg, for which the spring suspension is designed as standard.

The jointed contact points of the swinging arms with the wheel guide carrier, of the brake carrier with the swinging arms, and of the thrust rod with the brake carrier and the wheel guide carrier, are designed as sliding or rolling bearings. This guarantees an especially light response to the spring suspension even in the event of slight or short-corrugated irregularities in the surface and likewise improves the compensation for the brake diving forces in the event of load changes.

The wheel guide carrier can be designed as a single-limb or double-limb arrangement. In the single-limb design, the problem of precise matching of the spring characteristics of the two spring and damper elements is done away with, which, in the event of no synchronisation being provided, could lead to incorrect tilting, and thus to a sluggish reaction.

In the two-limbed design, the spring and damper elements and the bearings can be of simpler and lighter design format, since the forces are distributed symmetrically.

BRIEF DESCRIPTION OF THE DRAWINGS

The invention is explained in greater detail below, on the basis of an embodiment represented in the drawings.

DETAILED DESCRIPTION

Figure 1:
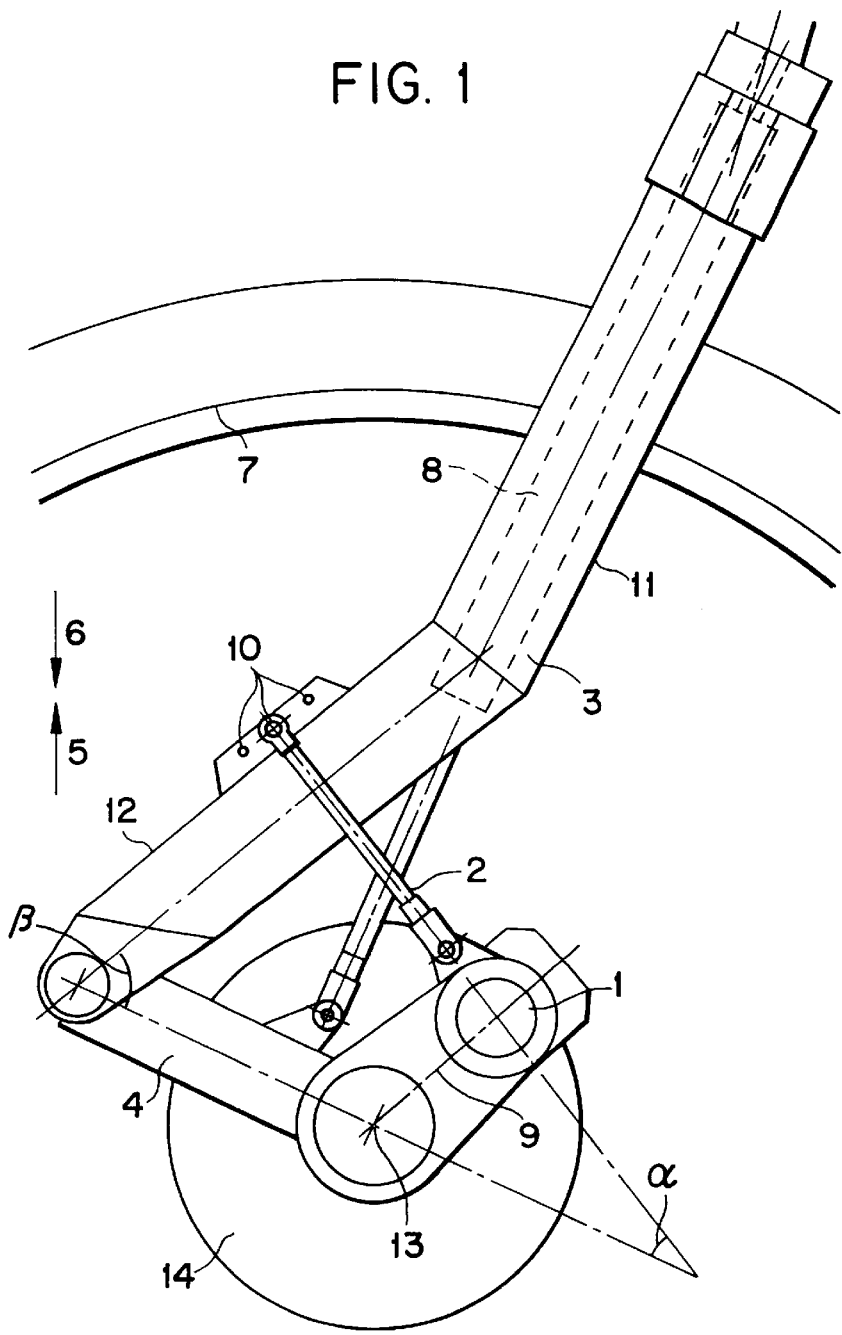
FIG. 1 shows a side view of the front section of a bicycle with the brake dive compensation arrangement according to the invention, but without the frame and handlebars being shown.

The brake dive compensation device comprises a single-limb wheel guide carrier 3, which is divided into an upper section 11 and a lower section 12. The lower section 12 is angled in the direction of travel, forwards in relation to the upper section 11. A swinging arm 4 is attached by a jointed connection to the lower end of the wheel guide carrier 3, which, at its other end, accommodates a wheel axle 13 for a front wheel 7. The jointed connection point of the swinging arm 4, with the wheel guide carrier 3, is located in the direction of travel in front of the wheel axle 13. This type of swinging arm is designated as a pulled swinging arm, and is characterized by an especially light response to unevenness of the ground.

The lower end of a spring element 8 is connected in front of the wheel axis 13 by means of a jointed link, which extends coaxially upwards to the upper section 11 of the wheel guide carrier 3, and is located in the carrier at the upper section 11. The upper part of the spring element 8 is connected by a jointed link to the wheel guide carrier 3. The spring element 8 is provided with an additional damper element.

In addition to this, a brake carrier 1 is arranged at the swinging arm 4, which in this case supports the brake calliper of a disk brake. The brake carrier 1 is supported about the wheel axis 13, in such a way as to be capable of slewing about this axis, and by means of a thrust rod 2 which is attached by means of a jointed connection between the brake carrier 1 and the wheel guide carrier 3. In addition to the jointed link location shown, it is also possible to make provision for further adjacent jointed link locations 10, to which the thrust rod 2 can be optionally secured by jointed links for the purpose of compensating for different static centers of gravity.

The thrust rod 2 forms an acute angle α with the axis of the drawn swinging arm 4. The angle α is selected in such a way that the acute angle is retained throughout the entire spring range. As a result of this, the thrust rod 2 is able at all times to exert a spreading force on the angle β formed between the swinging arm 4 and the wheel guide carrier 3.

In addition to this, the thrust rod 2, with the vehicle under static operational load conditions, is located at an approximate right angle to a central axis 9 of the brake carrier 1, the central axis running in a radial direction. When the device fluctuates between spring compression and spring extension about the tangential position, a high degree of linearity of the effect of the brake dive compensation is achieved.

The brake dive compensation device works as follows. When the front wheel brake is actuated, a tangential force is transferred from the brake disk 14 onto the brake carrier 1, and this is then imposed via the thrust rod 2 transversely into the upper area 12 of the wheel carrier guide 3. This force leads to a situation in which a spreading force occurs between the wheel guide carrier 3 and the drawn swinging arm 4, this force attempting to increase the assumed angle β and so relieve the burden on the spring element 8. A force component 5 is therefore derived, which is directed vertically upwards.

At the same time, the change in the dynamic wheel load into the forwards direction leads to a dive force 6 being exerted, the effort of which tends to cause the spring element 8 to dive, and to reduce the angle β between the wheel guide carrier 3 and the swinging arm 4. If correctly adjusted, these forces 5, 6, offset one another, irrespective of their absolute values. As a result, the angle between the swinging arm 4 and the wheel guide carrier 3, and the position of the spring element 8, remain constant. Additional forces, however, such as may arise when uneven ground is driven across, as before still cause the spring compression and extension of the swinging arm 4 and the spring element 8.

In the embodiment shown, the site of articulated linkage of the thrust rod 2 on the brake carrier 1 is located at the same distance from the wheel axle 13, on which the brake pads engage at the brake disk during the braking procedure. The angle enclosed between the thrust rod 2 and the wheel guide carrier 3 is, in this context, approximately a right angle. Compensation of the brake dive forces can, however, also be achieved if the distance from the location of the jointed link of the thrust rod 2 on the brake carrier 1 from the wheel axle 13 is increased, and the angle α between the thrust rod 2 and the swinging arm 4 is likewise enlarged, or, conversely, the distance between the location of the jointed link of the thrust rod 2 on the wheel carrier 1 from the wheel axle 13 is reduced, and the angle a between the thrust rod 2 and the swinging arm 4 is likewise reduced.

The exact adjustment of the interval and the angle α can be determined empirically or by calculating the force components, taking into account the design of the vehicle as a whole.

Figure 2:
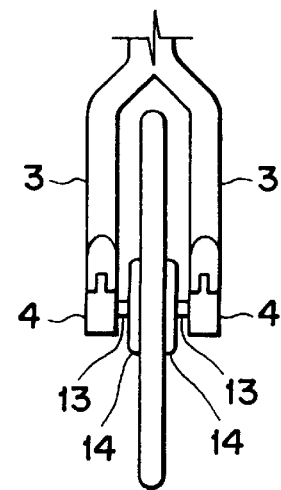
FIG. 2 schematically shows a front view of a brake dive compensation device according to an embodiment of the present invention including a two-limb wheel guide carrier.

The brake dive compensation device according to the present invention can be designed as a single-limb element or, as seen in FIG. 2, as a two-limb element.

We claim:

1. A brake dive compensation device for a front wheel spring suspension of a single-track vehicle, in which a front wheel of the vehicle including a wheel axle and a brake carrier, comprising:

a wheel guide carrier;

a spring element;

a drawn swinging arm attached to a wheel axis and a brake carrier including a brake of a front wheel, the swinging arm being supported by the spring element on the wheel guide carrier;

a thrust rod connected by a jointed link at one point to the brake carrier and by a jointed link at another point to the wheel guide carrier; and the spring element having a spring range and the thrust rod being arranged such that, when a force is imposed onto the wheel guide carrier during actuation of the brake to counteract a brake dive force, within a entire spring range, the thrust rod adopts an acute angle with a longitudinal axis of the swinging arm.

2. A brake dive compensation device according to claim 1, wherein the thrust rod is arranged at an approximate right angle to a central axis of the brake carrier, the axis running in a radial direction, when the vehicle is under static operational load conditions.

3. A brake dive compensation device according to claim 1, wherein the wheel guide carrier includes a plurality of jointed link locations for connection of the thrust rod to the wheel guide carrier.

4. A brake dive compensation device according to claim 1, wherein the wheel guide carrier includes an upper section and a lower section, the lower section being offset in a direction of travel relative to the upper section, and wherein the spring element at least partially disposed inside the upper section.

5. A brake dive compensation device according to claim 1, wherein an upper end of the spring element is attached by a jointed link to the swinging arm.

6. A brake dive compensation device according to claim 1, wherein the spring element includes a damping element.

7. A brake dive compensation device according to claim 1, wherein the spring element is adjustably connected to the wheel guide carrier for maintaining a constant zero position at different static operational loads.

8. A brake dive compensation device according to claim 1, wherein jointed link connections are provided to connect the swinging arms with the wheel guide carrier, the brake carrier (1) with the swinging arm, a the thrust rod with the brake carrier and the wheel guide carrier, and the jointed link connections include slide or rolling bearings.

9. A brake dive compensation device according to claim 1, wherein the wheel guide carrier is a single-limb element.

10. A brake dive compensation device according to claim 1, wherein the wheel guide carrier is a two-limb element.

11. A brake dive compensation device according to claim 2, wherein the wheel guide carrier includes a plurality of jointed link locations for connection of the thrust rod to the wheel guide carrier.

12. A brake dive compensation device according to claim 2, wherein the wheel guide carrier includes an upper section and a lower section, the lower section being offset in direction of travel relative to the upper section, and wherein the spring element at least partially disposed inside the upper section.

13. A brake dive compensation device according to claim 3, wherein the wheel guide carrier includes an upper section and a lower section, the lower section being offset in a direction of travel relative to the upper section, and wherein the spring element at least partially disposed inside the upper section.

14. A brake dive compensation device according to claim 2, wherein an upper end of the spring element is attached by a jointed link to the swinging arm direction of travel before or behind the wheel axis (13), or at the brake carrier (1).

15. A brake dive compensation device according to claim 3, wherein an upper end of the spring element is attached by a jointed link to the swinging arm.

16. A brake dive compensation device according to claim 2, wherein the spring element includes a damping element.

17. A brake dive compensation device according to claim 2, wherein the spring element is adjustably connected to the wheel guide carrier for maintaining a constant zero position at different static operational loads.

18. A brake dive compensation device according to claim 2, wherein jointed link connections are provided to connect the swinging arms with the wheel guide carrier, the brake carrier (1) with the swinging arm, a the thrust rod with the brake carrier and the wheel guide carrier, and the jointed link connections include slide or rolling bearings.

19. A brake dive compensation device according to claim 2, wherein the wheel guide carrier is a single-limb element.

20. A brake dive compensation device according to claim 2, wherein the wheel guide carrier is a two-limb element.

* * * * *